United States Patent
Sato et al.

(10) Patent No.: US 11,136,440 B2
(45) Date of Patent: *Oct. 5, 2021

(54) VINYLIDENE FLUORIDE RESIN FILM

(71) Applicant: Kureha Corporation, Tokyo (JP)

(72) Inventors: Nobufumi Sato, Tokyo (JP); Kazuyuki Kanno, Tokyo (JP); Yusuke Sato, Tokyo (JP); Keiko Aita, Tokyo (JP); Hisaaki Terashima, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 276 days.

This patent is subject to a terminal disclaimer.

(21) Appl. No.: 16/476,915

(22) PCT Filed: Jan. 16, 2018

(86) PCT No.: PCT/JP2018/000982
§ 371 (c)(1),
(2) Date: Jul. 10, 2019

(87) PCT Pub. No.: WO2018/139264
PCT Pub. Date: Aug. 2, 2018

(65) Prior Publication Data
US 2019/0330431 A1 Oct. 31, 2019

(30) Foreign Application Priority Data
Jan. 25, 2017 (JP) .............................. JP2017-011678

(51) Int. Cl.
*C08J 5/18* (2006.01)
*C08L 25/06* (2006.01)
*H01B 3/44* (2006.01)

(52) U.S. Cl.
CPC ................. *C08J 5/18* (2013.01); *C08L 25/06* (2013.01); *H01B 3/44* (2013.01); *C08J 2327/16* (2013.01)

(58) Field of Classification Search
CPC ......... C08J 5/18; C08J 2327/16; C08L 25/06; H01B 3/44
USPC .......................................................... 525/199
See application file for complete search history.

(56) References Cited

U.S. PATENT DOCUMENTS

| | | | | | |
|---|---|---|---|---|---|
| 4,302,408 | A | * | 11/1981 | Ichihara | .................. H01L 37/02 156/150 |
| 4,407,887 | A | * | 10/1983 | Hashizume | ............. H01L 37/02 428/332 |
| 4,615,943 | A | * | 10/1986 | Sakagami | .................. C08J 5/18 264/216 |
| 6,846,436 | B1 | | 1/2005 | Kitamura et al. | |
| 8,576,540 | B2 | | 11/2013 | Koh et al. | |
| 8,804,307 | B2 | * | 8/2014 | Koh | ........................... C08J 5/18 361/323 |
| 9,805,868 | B2 | * | 10/2017 | Nakatsuka | .................. C08J 5/18 |
| 2009/0087617 | A1 | | 4/2009 | Suzuki et al. | |
| 2010/0110609 | A1 | * | 5/2010 | Koh | ....................... H01G 4/206 361/323 |
| 2010/0178483 | A1 | | 7/2010 | Masuda et al. | |
| 2011/0013343 | A1 | | 1/2011 | Koh et al. | |
| 2012/0094070 | A1 | * | 4/2012 | Suzuki | ....................... C08J 5/18 428/141 |
| 2012/0293909 | A1 | | 11/2012 | Tatemichi et al. | |
| 2015/0377278 | A1 | | 12/2015 | Smith et al. | |
| 2016/0264742 | A1 | | 9/2016 | Kou et al. | |

FOREIGN PATENT DOCUMENTS

| | | |
|---|---|---|
| CN | 1350566 A | 5/2002 |
| CN | 101978446 A | 2/2011 |
| CN | 102666682 A | 9/2012 |
| CN | 105683265 A | 6/2016 |
| CN | 106024946 A | 10/2016 |
| CN | 106029754 A | 10/2016 |
| JP | S4637972 B1 | 11/1971 |
| JP | S60199046 A | 10/1985 |
| JP | S61123520 A | 6/1986 |
| JP | 61-198614 A | 9/1986 |
| JP | S6325024 A | 2/1988 |
| JP | 10-284340 A | 10/1998 |
| JP | 2008-18628 A | 1/2008 |
| JP | 2008280508 A | 11/2008 |
| JP | 2009062456 A | 3/2009 |
| JP | 2009-116527 A | 5/2009 |
| JP | 2009-215350 A | 9/2009 |
| JP | 4976762 B2 | 7/2012 |
| JP | 5380025 A | 1/2014 |
| JP | 2014082523 A | 5/2014 |

(Continued)

OTHER PUBLICATIONS

International Search Report for PCT/JP2018/000982 dated Apr. 17, 2018.
Translation of the International Search Report for PCT/JP2018/000982 dated Apr. 17, 2018.
Written Opinion of the International Searching Authority for PCT/JP2018/000982 dated Apr. 17, 2018.
Office Action dated Jun. 2, 2020, in Japanese Patent Application No. 2018-564493.
Communication Pursuant to Article 94(3) EPC dated Sep. 11, 2020, in EP 18 744 247.0.

(Continued)

*Primary Examiner* — Michael M. Bernshteyn
(74) *Attorney, Agent, or Firm* — Birch, Stewart, Kolasch & Birch, LLP

(57) ABSTRACT

A vinylidene fluoride resin film is produced by using a film composition containing at least a vinylidene fluoride resin and organic particles. The vinylidene fluoride resin film includes a plurality of protrusions on at least one surface thereof. Among the plurality of protrusions, the number of protrusions greater than 0.10 μm in height from a flat surface at which the protrusions are not present is from 40 to 400, per 0.10 mm² of the vinylidene fluoride resin film.

8 Claims, No Drawings

(56) References Cited

FOREIGN PATENT DOCUMENTS

| JP | 2016-74093 A | 5/2016 |
|---|---|---|
| KR | 10-2010-0109942 A | 10/2010 |
| KR | 10-2012-0123432 A | 11/2012 |
| WO | WO2008090947 A1 | 7/2008 |
| WO | WO 2009/116527 A1 | 9/2009 |
| WO | WO2013146367 A1 | 10/2013 |
| WO | WO2015129851 A1 | 9/2015 |

OTHER PUBLICATIONS

Office Action dated Dec. 18, 2020, in Republic of Korea Patent Application No. 10-2019-7015132.
Communication pursuant to Article 94(3) EPC dated Sep. 11, 2020, in EP 18 744 722.2.
English translation of International Preliminary Report on Patentability and Written Opinion dated Aug. 8, 2019, in PCT/JP2018/000969 (Forms PCT/IB/338, PCT/IB/373, and PCT/ISA/237).
Extended European Search Report dated Jan. 21, 2020, in European Patent Application No. 18744722.2.
International Search Report dated Apr. 17, 2018, in PCT/JP2018/000969.
Non-Final Office Action dated Oct. 1, 2020, in U.S. Appl. No. 16/467,559.
Notice ot Allowance dated Feb. 24, 2021, in U.S. Appl. No. 16/467,559.
Office Action dated Dec. 14, 2020, in Republic of Korea Patent Application No. 10-2019-7012771.
Office Action dated Feb. 10, 2021, in Chinese Patent Application No. 201880004276.3.
Office Action dated Jun. 2, 2020, in Japanese Patent Application No. 2018-564491.
Anonymous, "Horiba Scientific, A Guidebook to Particle Size Analysis," Jan. 1, 2012, pp. 1-32, Irvine, CA 92618, USA.
Extended European Search Report dated Jan. 21, 2020, in European Patent Application No. 18744247.0.
Notice of Information dated Mar. 17, 2020, in Japanese Application No. 2018-564493.
English translation of International Preliminary Report on Patentability and Written Opinion dated Aug. 8, 2019, in PCT/JP2018/000982 (Forms PCT/IB/338, PCT/IB/373, and PCT/ISA/237).

* cited by examiner

VINYLIDENE FLUORIDE RESIN FILM

TECHNICAL FIELD

The present invention relates to a vinylidene fluoride resin film, and particularly relates to a vinylidene fluoride resin film having a high relative permittivity.

BACKGROUND ART

Plastic insulating materials, having characteristics such as high insulation resistance, excellent frequency characteristics, and excellent flexibility, are expected as film materials for film capacitors for communication, electronic devices, power supply, medium/low voltage phase-advance, and inverters; and film materials for piezoelectric elements, pyroelectric elements, dielectrics for supporting a transfer body, and the like.

In recent years, various electrical equipment being controlled by inverters, and accordingly, a demand for smaller capacitors with a greater capacity has become even stronger. In response to such a demand in the market, particularly for automotive applications (including hybrid car applications), a further decrease in the film thickness is required while the breakdown strength of the film capacitor or element processability is enhanced.

It is known that a film capacitor having a smaller thickness and a higher dielectric constant can provide an element having a large capacitance. In a typical film capacitor, a resin having a relatively low dielectric constant such as polypropylene is used, but it has been proposed to produce a film capacitor with a high relative permittivity by using a vinylidene fluoride resin, which has a high dielectric constant.

Regarding vinylidene fluoride resins, for example, Patent Document 1 describes a vinylidene fluoride resin composition containing from 95 to 30 wt. % of a vinylidene fluoride resin and from 5 to 70 wt. % of a polyether. An example of the polyether is polyoxymethylene.

For example, Patent Documents 2 to 5 describe technologies related to films.

The film described in Patent Document 2 is a high-dielectric film formed by using a fluororesin containing a total of 95 mol % or greater of vinylidene fluoride units and tetrafluoroethylene units and is a film for a film capacitor which has a high dielectric property and high breakdown voltage and which can be made thinner.

The film described in Patent Document 3 is a high-dielectric film containing a vinylidene fluoride resin and organic particles.

On the other hand, the film described in Patent Document 4 is a biaxially stretched polypropylene film in which a target surface morphology is formed by using crystal modification of a polypropylene film.

Furthermore, Patent Document 5 describes a stretched film made from a syndiotactic polystyrene-based resin composition. The stretched film contains two types of particles having different particle sizes, and at least one of the particles is silica particles.

CITATION LIST

Patent Literature

Patent Document 1: JP 60-199046 A
Patent Document 2: WO 2008/090947
Patent Document 3: WO 2013/146367
Patent Document 4: JP 2014-082523 A

SUMMARY OF INVENTION

Technical Problem

However, in the vinylidene fluoride resin film of Patent Document 2, dielectric breakdown may occur, and there is a problem in the winding properties of the film.

The biaxially stretched polypropylene film described in Patent Document 4 has a low dielectric constant. Therefore, there is a limitation on the size reduction of capacitors or the like produced by using such a film.

As a method for improving the winding properties of a resin film, a method is known in which silica particles are contained in the film, as described in Patent Document 5. In general, when inorganic particles are blended into a resin such as fluororesin, which has a small surface energy, the inorganic particles affect the film properties such as dispersibility, film processability, and film winding properties. However, the effect of the case where the inorganic particles are blended in a resin having a small surface energy may not be as comparable as the effects caused by the inorganic particle to a typical resin film. In particular, when a vinylidene fluoride resin and a silicon oxide compound are melt-kneaded, the vinylidene fluoride resin may decompose, which is not preferable.

Furthermore, in the case of melt molding a resin in which inorganic particles are blended, a flow path of a molten resin such as a die lip may be damaged by the inorganic particles, which is not preferable.

In light of the problems described above, an object of the present invention is to provide a vinylidene fluoride resin film that can be made thinner and that has enhanced film winding properties.

Solution to Problem

To solve the problems described above, the vinylidene fluoride resin film according to an embodiment of the present invention is a vinylidene fluoride resin film including a film composition containing a vinylidene fluoride resin and organic particles, wherein the vinylidene fluoride resin film includes a plurality of protrusions on at least one surface thereof; and among the plurality of protrusions, the number of protrusions greater than 0.10 μm in height from a flat surface at which the protrusions are not present is from 40 to 400, per 0.10 mm$^2$ of the vinylidene fluoride resin film.

Advantageous Effects of Invention

The present invention can provide a vinylidene fluoride resin film that can be made thinner and that has enhanced film winding properties.

DESCRIPTION OF EMBODIMENTS

The vinylidene fluoride resin film according to an embodiment of the present invention (hereinafter, also simply referred to as "film") is a film including a composition containing at least a vinylidene fluoride resin and organic particles, wherein the vinylidene fluoride resin film includes a plurality of protrusions on at least one surface thereof; and among the plurality of protrusions, the number of protrusions greater than 0.10 μm in height from a flat surface at which the protrusions (fillers) are not present is from 40 to 400, per 0.10 mm$^2$ of the vinylidene fluoride resin film.

Details of the vinylidene fluoride resin film will be described below.

Film Composition

The film composition according to the present embodiment is a composition containing at least a vinylidene fluoride resin and organic particles.

In the present specification, "vinylidene fluoride resin" means a polymer containing a vinylidene fluoride monomer as a main component. In the present embodiment, as the vinylidene fluoride resin, typically, a homopolymer of vinylidene fluoride is used; however, a copolymer of vinylidene fluoride (hereinafter, also referred to as "vinylidene fluoride copolymer") can also be used. The vinylidene fluoride copolymer contains preferably 90% or greater, more preferably 95% or greater, and even more preferably 97% or greater of a vinylidene fluoride monomer. Reducing the content of monomers other than vinylidene fluoride monomer in the vinylidene fluoride copolymer can suppress failures such as a decrease in the melting point of the vinylidene fluoride resin and/or a decrease in a dielectric constant.

Such a vinylidene fluoride resin, having a high relative permittivity (ε), is preferable as a material for a high-dielectric film.

The relative permittivity (23° C., 20 kHz) of the vinylidene fluoride resin of the present embodiment is preferably 6.0 or greater, more preferably 8.0 or greater, and even more preferably 9.0 or greater.

The vinylidene fluoride resin according to the present embodiment may be a vinylidene fluoride copolymer of a vinylidene fluoride monomer and another monomer, or it may be a vinylidene fluoride homopolymer consisting of only one type of vinylidene fluoride monomer. Examples of other monomers include vinyl fluoride, trifluoroethylene, tetrafluoroethylene, chlorotrifluoroethylene, hexafluoropropylene, and perfluoroalkyl vinyl ethers represented by perfluoromethyl vinyl ether. Hexafluoropropylene is most preferable as another monomer from the perspective of ease in processing.

The vinylidene fluoride resin of the present embodiment is preferably a homopolymer of vinylidene fluoride, a vinylidene fluoride-hexafluoropropylene copolymer, or a mixture thereof. Furthermore, when the vinylidene fluoride resin of the present embodiment is a mixture of vinylidene fluoride homopolymer and vinylidene fluoride-hexafluoropropylene copolymer, the mixing ratio thereof is not particularly limited.

The molecular structure of the vinylidene fluoride resin of the present embodiment may be linear or branched.

As the vinylidene fluoride resin of the present embodiment, for example, a known linear polyvinylidene fluoride (e.g. KF #1100, available from Kureha Corporation) can be suitably used.

The average particle size of the organic particles in the present embodiment is preferably from 0.80 μm to 3.0 μm, more preferably from 1.5 μm to 2.0 μm, and even more preferably from 1.8 μm to 2.0 μm. In the case where the average particle size of the organic particles is too small, the protrusions may be small, and the winding properties of the film may become poor. On the other hand, in the case where the average particle size of the organic particles is too large, the protrusions become large, and there is a risk that breakage occurs upon stretching.

The organic particles of the present embodiment are preferably a resin that does not melt in a processing step of the film and that is less likely to deform after the film processing, and for example, are preferably particles of crosslinked acrylic resin and/or crosslinked styrene resin. Note that, in the case where the film composition contains two or more types of organic particles, the compounding ratio of these organic particles is not particularly limited.

As the crosslinked acrylic resin, a publicly known resin, such as MX-80H3wT, MX-150, and MX-180TA (all of these are available from Soken Chemical & Engineering Co., Ltd.) and SSX-101 (available from Tech-Polymer), can be used.

Furthermore, as the crosslinked polystyrene resin, a publicly known resin, such as SX-130H (available from Soken Chemical & Engineering Co., Ltd.), can be used.

The film composition of the present embodiment contains from 0.050 parts by weight to 3.0 parts by weight, preferably from 0.050 parts by weight to 1.0 part by weight, and more preferably from 0.10 parts by weight to 0.30 parts by weight of the organic particles, per 100 parts by weight of the vinylidene fluoride resin. The content of the organic particles in this range is preferable because the winding properties of the film are enhanced, and the film can be stretched without breaking.

The film composition of the present embodiment may contain another resin besides the vinylidene fluoride resin and the organic particles. For example, the film composition may further contain an acrylic resin as a polymeric processing aid. The film composition may contain from 0.10 parts by weight to 10 parts by weight, preferably from 0.50 parts by weight to 5.0 parts by weight, and more preferably from 1.0 part by weight to 3.0 parts by weight of the polymeric processing aid, per 100 parts by weight of the vinylidene fluoride resin. From the perspectives of enhancing stretchability and smoothness of the film, Metablen (trade name) P-531A (available from Mitsubishi Rayon Co., Ltd.), which is an acrylic processing aid, is preferable as the polymeric processing aid.

Method of Producing Vinylidene Fluoride Resin Film

An embodiment of the method of producing the vinylidene fluoride resin film according to the present embodiment will be described below.

The vinylidene fluoride resin film according to the present embodiment can be obtained by, for example, mixing organic particles into pellets made from a vinylidene fluoride resin, then melting and extrusion-molding this vinylidene fluoride resin, and then further stretching the resin. An example of the method of producing the vinylidene fluoride resin film will be described in detail below, but the method of producing the vinylidene fluoride resin film according to the present embodiment is not limited to the following method.

Pellets formed from a polyvinylidene fluoride resin (hereinafter, also referred to as "polyvinylidene fluoride resin pellets") can be obtained by blending 0.30 parts by weight of crosslinked acrylic resin (MX-180TA, available from Soken Chemical & Engineering Co., Ltd.) with 100 parts by weight of linear polyvinylidene fluoride resin (KF #1100, available from Kureha Corporation), which has a density of from 1.77 to 1.79 g/cm$^3$, a melt flow rate (MFR) of 2 to 4 g/10 min, and a melt viscosity of 3300 Pa·s; supplying the mixture into a co-rotating twin screw extruder equipped with a feeder (TEM-26SS, available from Toshiba Machine Co., Ltd., screw diameter: 26 mm (L/D=48.5)); melt-kneading the mixture at a screw rotational speed of 200 rpm, and melt-extruding the mixed resin.

In this case, the setting temperature of the extruder may be a temperature at which the mixed resin can be melt-extruded, and for example, the temperature may be from 150° C. to 250° C.

When the melt-extruded resin is cut by, for example, a pelletizer, polyvinylidene fluoride pellets containing the organic particles can be obtained.

A film is formed by melt-extruding the polyvinylidene fluoride pellets containing the organic particles obtained as described above. The obtained unstretched film is then stretched to obtain the vinylidene fluoride resin film according to the present embodiment.

Examples of the stretching method include biaxial stretching. A method of producing a polyvinylidene fluoride film obtained by biaxial stretching (hereinafter, also referred to as "biaxially stretched polyvinylidene fluoride film") will be described in detail below.

First, polyvinylidene fluoride pellets containing the organic particles are supplied to a known melt extruder. A single screw or twin-screw extruder can be used as the extruder in the production of a biaxially stretched polyvinylidene fluoride film.

The polymer obtained by performing melt extrusion by the extruder is filtrated through a filter. This filtration eliminates foreign substances contained in the polymer, such as foreign substances contained in the raw material, foreign substances that are mixed from the outside during the molding process of the film, and organic particles that are aggregated by association and that are too large in size. The filter can be appropriately selected from filters having an aperture in a range where an increase in resin pressure does not substantially affect the processability of the film. Subsequently, the polymer is extruded into a sheet form through a T-die, for example, and cooled and solidified on a casting roll to produce an unstretched film.

The biaxially stretched polyvinylidene fluoride film can be produced, for example, by sequential stretching. At this time, the first stretching in the longitudinal direction can be performed at a stretching temperature from 110° C. to 170° C. and preferably from 140° C. to 165° C. and at a stretching ratio from 2.0 times to 10 times and preferably 2.5 times to 4.0 times. The stretching temperature in the longitudinal direction is important in suppressing the occurrence of scratches, and when the stretching temperature in the longitudinal direction is lower than 110° C., the film surface may be scratched, or the film tends to break. On the other hand, when the stretching temperature in the longitudinal direction is higher than 170° C., the film surface undergoes thermal damage and the film becomes brittle, which are not preferable.

Thereafter, stretching is performed by a tenter stretching machine (available from Ichikin Co., Ltd.) set to from 110° C. to 170° C. and preferably 140° C. to 165° C. and the stretching ratio in the width direction from 2.0 times to 10 times and preferably 3.0 times to 5.0 times. The film tends to break when the stretching temperature in the width direction is lower than 110° C., and sufficient strength cannot be obtained when the stretching temperature in the width direction is higher than 170° C., which are not preferable. Such temperatures are also not preferable from the perspectives of the occurrence of uneven stretch marks and thermal damage caused on the film. Note that, the total stretching ratio in the longitudinal direction and in the width direction is from 4.0 times to 20 times and preferably from 5.0 to 10 from the perspective of avoiding such uneven stretch marks. When the total stretching ratio is less than 4.0 times, uneven stretch marks tend to occur, and sufficient strength of the film is less likely to be achieved. Furthermore, when the total stretching ratio is greater than 10 times, film breakage tends to occur, and stable film production is difficult.

In the present embodiment, the ratio can be selected at any time as needed to achieve the target breaking strength. In order to make the breaking strength in the width direction high, the stretching ratio in the width direction is preferably set higher than the stretching ratio in the longitudinal direction. The biaxially stretched film is slit to an appropriate width and length by the slit process and wound.

Note that the method of producing the vinylidene fluoride resin film according to the present embodiment is not limited to the method described above. For example, a single polyvinylidene fluoride resin and organic particles may be added during the production of vinylidene fluoride resin film (film roll). Alternatively, pellets containing organic particles and a single polyvinylidene fluoride resin may be mixed during the production of vinylidene fluoride resin film (film roll).

Vinylidene Fluoride Resin Film

For example, the vinylidene fluoride resin film of the present embodiment obtained as described above has a plurality of protrusions on at least one surface of the vinylidene fluoride resin film. Note that, in the present embodiment, the protrusions may be formed on both faces of the vinylidene fluoride resin film.

In the vinylidene fluoride resin film of the present embodiment, among the plurality of protrusions, the number of the protrusions greater than 0.10 μm in height from a flat surface is from 40 to 400, preferably from 40 to 200, and more preferably from 50 to 100, per 0.10 $mm^2$ of the vinylidene fluoride resin film. With the number of protrusions in this range, there is no risk of air entrapment in the film when winding the vinylidene fluoride resin film. Furthermore, in this range, the occurrence of wrinkles, streaks, and the like on the surface of the vinylidene fluoride resin film can be effectively prevented.

Note that, in the present specification, "flat surface" specifically refers to a surface at which no protrusions are formed.

The average protrusion height of the vinylidene fluoride resin film is preferably from 0.18 μm to 1.0 μm, more preferably from 0.18 μm to 0.50 μm, and even more preferably from 0.18 μm to 0.30 μm. The average protrusion height in this range is preferable from the perspective of enhancing the winding property of the film.

Note that, in the present specification, "average protrusion height" of protrusions refers to an average value of heights from a film flat surface of protrusions greater than 0.10 μm in height present on the surface of the vinylidene fluoride resin film.

Note that, in the present specification, the number of protrusions is a number of protrusions greater than 0.10 μm in height, which is determined by specifying an area observed by a laser microscope (available from Keyence Corporation) and counting the number of protrusions greater than 0.10 μm in height from a film flat surface and that are within the area by using analytical software. In order to accurately count the number of protrusions, the number of protrusions are preferably counted with the field of view magnified at least 10 times and preferably at least 50 times.

The film thickness of the vinylidene fluoride resin film of the present embodiment is preferably from 1.0 μm to 8.0 μm, more preferably from 1.5 μm to 5.0 μm, and even more preferably from 1.5 μm to 3.0 μm. This range enables a reduction in the size of a product, such as a capacitor, produced by using the vinylidene fluoride resin film according to the present embodiment.

Note that, in the vinylidene fluoride resin film of the present embodiment, a relationship $0.18 \leq d/t \leq 2.0$ is preferably satisfied, where the average particle size of the organic particles contained in the film composition is d (μm) and the film thickness of the vinylidene fluoride resin film is t (μm). With this range, it is possible to achieve a vinylidene fluoride resin film in which the risk of breakage due to use is reduced and which can be suitably wound.

Furthermore, the vinylidene fluoride resin film of the present embodiment has a coefficient of static friction of from 0.20 to 0.50, preferably from 0.30 to 0.50, and more preferably from 0.40 to 0.50. The coefficient of static friction within this range enables an effective suppression of the occurrence of unevenness caused by distortion of the film such as wrinkles and streaks on the surface of the film and enhances winding property. Note that, in the present specification, "coefficient of static friction" refers to the coefficient of friction when the film starts sliding.

In addition, the vinylidene fluoride resin film of the present embodiment includes a vinylidene fluoride resin as a base material and thus has a high relative permittivity.

Furthermore, according to the vinylidene fluoride resin film of the present embodiment, the formation of the protrusions enhances the winding property of the film.

The dielectric breakdown voltage of the vinylidene fluoride resin film of the present embodiment is 500 kV/mm or greater, and the dielectric breakdown strength is sufficiently high. Therefore, the vinylidene fluoride resin film of the present embodiment can be stably used as a film capacitor compared to a vinylidene fluoride resin film produced by using only vinylidene fluoride resins.

Note that "dielectric breakdown strength" or "strength of dielectric breakdown" refers to the dielectric breakdown voltage per thickness, which is a value obtained by dividing dielectric breakdown voltage by the thickness of the insulator (the film in the present specification), as defined in JIS-C 2110 and JIS-C 2151.

Therefore, for example, a metal vapor-deposited capacitor, in which a metal vapor-deposited film formed on the vinylidene fluoride resin film of the present embodiment is used as an electrode, is less likely to experience a short-circuit and less likely to result in dielectric breakdown even in abnormal discharge. In addition, even when defects occur due to the repeated use of such a metal vapor-deposited capacitor, gaps between the films allow rapid cooling and releasing of the generated gas, thereby improving safety ("self-healing" property).

From this perspective, the vinylidene fluoride resin film of the present embodiment is preferably used in, for example, a capacitor.

As is clear from the description above, the coefficient of static friction of the vinylidene fluoride resin film of the present embodiment is preferably from 0.20 to 0.50.

Furthermore, in the vinylidene fluoride resin film of the present embodiment, a relationship 0.18≤d/t≤2.0 is preferably satisfied, where the average particle size of the organic particles is d (μm) and the film thickness of the vinylidene fluoride resin film is t (μm).

Furthermore, in the vinylidene fluoride resin film of the present embodiment, the film composition preferably contains from 0.050 parts by weight to 3.0 parts by weight of the organic particles, per 100 parts by weight of the vinylidene fluoride resin.

Furthermore, in the vinylidene fluoride resin film of the present embodiment, the organic particles are preferably one or more types of resin particles selected from the group consisting of crosslinked acrylic resins and crosslinked styrene resins.

Furthermore, in the vinylidene fluoride resin film of the present embodiment, a homopolymer of vinylidene fluoride is preferably used for the vinylidene fluoride resin; however, the vinylidene fluoride resin can also use a vinylidene fluoride-hexafluoropropylene copolymer or a mixture thereof.

Furthermore, in the vinylidene fluoride resin film of the present embodiment, the film thickness thereof is preferably from 1.0 μm to 10 μm.

Furthermore, in the vinylidene fluoride resin film of the present embodiment, the average particle size of the organic particles is preferably from 0.50 μm to 5.0 μm.

Furthermore, in the vinylidene fluoride resin film of the present embodiment, the average protrusion height of the protrusions is preferably from 0.15 μm to 1.0 μm.

The present invention is not limited to the embodiments described above, and various modifications are possible within the scope indicated in the claims. Embodiments obtained by appropriately combining the technical means disclosed by other embodiments are also included in the technical scope of the present invention.

EXAMPLES

The present invention will be described in detail below based on examples, but the present invention is not limited to these examples.

Example 1

Production of Film
Preparation of Film Composition

A film composition was prepared by adding 0.30 parts by weight of crosslinked acrylic resin SSX-101 (available from Tech-Polymer) as organic particles to 100 parts by weight of linear polyvinylidene fluoride resin having a melt flow rate (MFR) of 2 to 4 g/10 min (KF #1100, available from Kureha Corporation) and uniformly mixing.

Production of Pellet

The film composition obtained as described above was supplied in a co-rotating twin screw extruder (TEM-26, available from Toshiba Machine Co., Ltd.), in which the temperature was adjusted to from 160° C. to 230° C., and melt-kneaded to produce pellets.

Production of Unstretched Sheet

The pellets obtained as described above were fed into a single screw extruder (available from Union Plastics), and the kneaded resin product at a resin temperature of 270° C. to 280° C. was filtered through a 200 mesh stainless steel filter and then extruded. The resin kneaded product was first casted on a first metal drum in which the surface was maintained at 100° C., and then further cooled on a second metal drum in which the surface was maintained at 50° C., to produce an unstretched sheet from the film composition.

Production of Film

The unstretched sheet obtained as described above was stretched uniaxially in the longitudinal direction at from 150 to 160° C. using a stretching roll, then introduced into a tenter stretching machine set to from 150° C. to 160° C., and stretched in the lateral direction to obtain a biaxially stretched film having a thickness of 2.1 μm.

Examples 2 to 4

Each biaxially stretched film was produced in the same manner as in Example 1 except for changing the film thickness to the film thickness described in Table 1.

Examples 5 and 6

Each biaxially stretched film was produced in the same manner as in Example 1 except for adding 0.10 parts by weight of crosslinked styrene resin SX-130H as organic particles and changing the film thickness to the film thickness described in Table 1.

Examples 7 and 8

Each biaxially stretched film was produced in the same manner as in Example 5 except for changing the added amount of the organic particles to 0.30 parts by weight and changing the film thickness to the film thickness described in Table 1.

Examples 9 to 12

Each biaxially stretched film was produced in the same manner as in Example 1 except for changing the organic particles to crosslinked acrylic resin MX-150 and changing the film thickness to the film thickness described in Table 1.

Examples 13 and 14

Each biaxially stretched film was produced in the same manner as in Examples 5 and 6 except for using crosslinked acrylic resin MX-180TA as organic particles.

Examples 15 to 18

Each biaxially stretched film was produced in the same manner as in Example 13 except for changing the added amount of the organic particles to 0.30 parts by weight and changing the film thickness to the film thickness described in Table 1.

Examples 19 to 22

Each biaxially stretched film was produced in the same manner as in Example 1 except for adding 0.10 parts by weight of crosslinked acrylic resin NMB-0220C as organic particles and changing the film thickness to the film thickness described in Table 2.

Examples 23 to 26

Each biaxially stretched film was produced in the same manner as in Example 19 except for changing the added amount of the organic particles to 0.30 parts by weight and changing the film thickness to the film thickness described in Table 2.

Examples 27 to 29

Each biaxially stretched film was produced in the same manner as in Example 1 except for adding 0.10 parts by weight of crosslinked acrylic resin NMB-0520C as organic particles and changing the film thickness to the film thickness described in Table 2.

Examples 30 to 32

Each biaxially stretched film was produced in the same manner as in Example 27 except for changing the added amount of the organic particles to 0.30 parts by weight and changing the film thickness to the film thickness described in Table 2.

Comparative Examples 1 to 4

Each biaxially stretched film was produced in the same manner as in Example 1 except for adding no organic particles and changing the film thickness to the film thickness described in Table 3.

Comparative Examples 5 to 8

Each biaxially stretched film was produced in the same manner as in Example 1 except for adding 0.30 parts by weight of crosslinked acrylic resin MX-80H3wT as organic particles and changing the film thickness to the film thickness described in Table 3.

Comparative Examples 9 and 10

Each biaxially stretched film was produced in the same manner as in Example 1 except for adding 0.10 parts by weight of SX-130H as organic particles and changing the film thickness to the film thickness described in Table 3.

Comparative Examples 11 and 12

Each biaxially stretched film was produced in the same manner as in Comparative Example 9 except for changing the added amount of the organic particles to 0.30 parts by weight and changing the film thickness to the film thickness described in Table 3.

Comparative Examples 13 and 14

Each biaxially stretched film was produced in the same manner as in Example 1 except for adding 0.10 parts by weight of MX-150 as organic particles and changing the film thickness to the film thickness described in Table 3.

Comparative Examples 15 and 16

Each biaxially stretched film was produced in the same manner as in Comparative Example 13 except for changing the film thickness to the film thickness described in Table 3.

Comparative Examples 17 and 18

Each biaxially stretched film was produced in the same manner as in Example 1 except for adding 0.10 parts by weight of MX-180TA as organic particles and changing the film thickness to the film thickness described in Table 3.

Comparative Example 19

Each biaxially stretched film was produced in the same manner as in Example 1 except for adding 0.10 parts by weight of NMB-0520C as organic particles and changing the film thickness to 2.0 µm.

Comparative Example 20

Each biaxially stretched film was produced in the same manner as in Comparative Example 19 except for changing the added amount of the organic particles to 0.30 parts by weight and changing the film thickness to 2.2 µm.

Organic Particle Size Evaluation

The following tests were performed on each of the organic particles of Examples 1 to 32 and Comparative Examples 1 to 20.

The organic particles were dispersed in an aqueous solution of sodium hexametaphosphate (available from Wako Pure Chemical Industries, Ltd.), and ultrasonic treatment was performed. Thereafter, the particle size was measured by using a particle size distribution measurement device (MicroTrac MT3300EX II, available from MicrotracBEL Corp.). Note that the refractive index of the dispersion solvent was 1.33, and the refractive index of the organic particle was 1.49.

Film Evaluation

The following tests were performed on each of the films of Examples 1 to 32 and Comparative Examples 1 to 20.

Film Thickness Measurement

The film was folded into a film with 10 panels, and then 40 positions were marked at 5.0 mm intervals in the TD direction in along the center of the film. Thereafter, the film thicknesses at all 40 positions were measured by a micrometer method using a benchtop thickness gauge (TOF-5R, available from Yamabun Electronics Co., Ltd.), and the average thickness was calculated by using the values at all the 40 positions obtained by dividing each film thickness value by 10.

Average Particle Size (d)/Film Thickness (t)

Using the film thickness obtained as described above, the value of average particle size (d)/film thickness (t) was calculated.

Average Protrusion Height and Number of Protrusions

The surface morphology of the film was measured by using a shape analysis laser microscope (VK-X250, available from Keyence Corporation). From the observed image, the average protrusion height of protrusions greater than 0.10 μm in height from the flat surface at which the protrusions are not present, and the number of protrusions per 0.10 mm² were calculated by volume area measurement analysis. Note that the number of measurements per sample was 10, and the average value was determined from all the measured values. Furthermore, the configuration conditions of the shape analysis laser microscope are as follows.

Roughness standard: ISO25178-2:2012
Objective lens: ×50
Filter type: Gaussian
S-filter: None
F-operation: None
L-filter: 0.080 mm
Terminal effect correction: Effective
1 shot measurement area: 212.347×287.222 (μm²)
Measurement area: 3×3 views (9 shots)
Measurement parameters: Average protrusion height (St), number of protrusions per 0.10 mm² (Pc)
Analysis area: 0.40×0.60 (mm²)
Height threshold: 0.10 μm
Lower limit setting value of microregion: 50 pixel Coefficient of Friction The coefficient of friction was measured in accordance with JIS K 7125:1999 except for attaching a vinylidene fluoride resin film to a glass plate, attaching a polypropylene film (Pylen film CT P1011, available from Toyobo Co., Ltd.) having a thickness of 40 μm to a metal sliding piece, and performing the test with no spring.

Note that the number of measurements per sample was 5, and the average value was determined from all the measured values. The measuring instrument and the conditions are as described below.

Measuring instrument: Friction tester (TR type, available from Toyo Seiki Seisaku-sho, Ltd.)
Measurement direction: Film longitudinal direction
Test Speed: 100 mm/min
Mass of sliding piece: 200 g Winding Property The film was wound, and wrinkles (longitudinal streaks) or displacement occurred in the film after winding were visually observed. In a case where the number of wrinkles generated in the film after winding was less than 5, the winding property of the film was evaluated as "Good: A". In a case where the number of wrinkles was 5 or greater, the winding property of the film was evaluated as "Poor: B". Note that, in a case where the winding property of the film is evaluated as "Good: A", the film is considered to be at a practical level.

Film Processability

When the film was processed by stretching the film, in a case where a film was processed without tearing the film, the film processability was evaluated as "Good: A". In a case where the film could not be processed due to occurrence of breakage or the like, the film processability was evaluated as "Poor: B".

Dielectric Breakdown Strength (Breakdown Voltage)

The dielectric breakdown voltage was measured in accordance with DIS-C 2151. The measured value of the dielectric breakdown voltage was divided by the film thickness (m) of the sample, and the obtained value was shown in kV/mm. The measuring instrument and the conditions are as described below.

Measurement instrument: DC Hipot (withstand voltage)/insulation resistance tester (TOS5301s), available from Kikusui Electronics Corp.
Voltage increase rate: 0.250 kV/sec
Upper limit current: 20 μA
Spherical electrode: 6.0 mm
Number of measurements: n=100

The measurement results described above are summarized in Tables 4 and 5.

TABLE 1

| | | Organic particles | | Film | | | |
|---|---|---|---|---|---|---|---|
| | Type | Average particle size d (μm) | Added amount (phr) | Thickness t (μm) | St (μm) | Pc (number of protrusions/ 0.1 mm²) | d/t (—) |
| Example 1 | SSX-101 | 1.4 | 0.30 | 2.1 | 0.18 | 51 | 0.68 |
| Example 2 | | 1.4 | 0.30 | 3.4 | 0.20 | 90 | 0.41 |
| Example 3 | | 1.4 | 0.30 | 5.3 | 0.20 | 114 | 0.26 |
| Example 4 | | 1.4 | 0.30 | 7.6 | 0.21 | 102 | 0.18 |

TABLE 1-continued

|  | Organic particles | | | Film | | |
|---|---|---|---|---|---|---|
|  |  | Average particle size d (μm) | Added amount (phr) | Thickness t (μm) | St (μm) | Pc (number of protrusions/ 0.1 mm$^2$) | d/t (—) |
| Type |  |  |  |  |  |  |  |

| | Type | Average particle size d (μm) | Added amount (phr) | Thickness t (μm) | St (μm) | Pc (number of protrusions/ 0.1 mm$^2$) | d/t (—) |
|---|---|---|---|---|---|---|---|
| Example 5 | SX-130H | 1.4 | 0.10 | 2.1 | 0.21 | 78 | 0.66 |
| Example 6 |  | 1.4 | 0.10 | 3.5 | 0.17 | 44 | 0.41 |
| Example 7 | SX-130H | 1.4 | 0.30 | 2.2 | 0.22 | 111 | 0.65 |
| Example 8 |  | 1.4 | 0.30 | 3.6 | 0.22 | 74 | 0.39 |
| Example 9 | MX-150 | 1.6 | 0.30 | 2.1 | 0.20 | 70 | 0.77 |
| Example 10 |  | 1.6 | 0.30 | 3.6 | 0.24 | 92 | 0.44 |
| Example 11 |  | 1.6 | 0.30 | 5.7 | 0.18 | 79 | 0.28 |
| Example 12 |  | 1.6 | 0.30 | 8.2 | 0.25 | 135 | 0.20 |
| Example 13 | MX-180TA | 1.9 | 0.10 | 2.1 | 0.19 | 71 | 0.89 |
| Example 14 |  | 1.9 | 0.10 | 3.5 | 0.23 | 71 | 0.54 |
| Example 15 | MX-180TA | 1.9 | 0.30 | 2.2 | 0.22 | 71 | 0.88 |
| Example 16 |  | 1.9 | 0.30 | 3.7 | 0.24 | 81 | 0.52 |
| Example 17 |  | 1.9 | 0.30 | 5.4 | 0.22 | 85 | 0.35 |
| Example 18 |  | 1.9 | 0.30 | 8.0 | 0.28 | 85 | 0.24 |

TABLE 2

| | Type | Average particle size d (μm) | Added amount (phr) | Thickness t (μm) | St (μm) | Pc (number of protrusions/ 0.1 mm$^2$) | d/t (—) |
|---|---|---|---|---|---|---|---|
| Example 19 | NMB-0220C | 2.5 | 0.10 | 2.0 | 0.26 | 59 | 1.24 |
| Example 20 |  | 2.5 | 0.10 | 3.4 | 0.31 | 110 | 0.73 |
| Example 21 |  | 2.5 | 0.10 | 5.2 | 0.39 | 161 | 0.48 |
| Example 22 |  | 2.5 | 0.10 | 7.7 | 0.39 | 161 | 0.33 |
| Example 23 | NMB-0220C | 2.5 | 0.30 | 2.0 | 0.28 | 138 | 1.25 |
| Example 24 |  | 2.5 | 0.30 | 3.6 | 0.34 | 248 | 0.70 |
| Example 25 |  | 2.5 | 0.30 | 5.3 | 0.43 | 345 | 0.47 |
| Example 26 |  | 2.5 | 0.30 | 7.9 | 0.44 | 389 | 0.32 |
| Example 27 | NMB-0520C | 4.8 | 0.10 | 3.5 | 0.49 | 69 | 1.37 |
| Example 28 |  | 4.8 | 0.10 | 5.4 | 0.66 | 69 | 0.90 |
| Example 29 |  | 4.8 | 0.10 | 7.6 | 0.75 | 80 | 0.63 |
| Example 30 | NMB-0520C | 4.8 | 0.30 | 4.0 | 0.64 | 141 | 1.21 |
| Example 31 |  | 4.8 | 0.30 | 5.6 | 0.75 | 161 | 0.86 |
| Example 32 |  | 4.8 | 0.30 | 8.3 | 0.90 | 167 | 0.58 |

TABLE 3

| | Type | Average particle size d (μm) | Added amount (phr) | Thickness t (μm) | St (μm) | Pc (number of protrusions/ 0.1 mm$^2$) | d/t (—) |
|---|---|---|---|---|---|---|---|
| Comparative Example 1 | No filler | — | — | 2.0 | — | 0 | — |
| Comparative Example 2 |  | — | — | 3.3 | — | 0 | — |
| Comparative Example 3 |  | — | — | 5.2 | — | 0 | — |
| Comparative Example 4 |  | — | — | 7.8 | — | 0 | — |
| Comparative Example 5 | MX-80H3wT | 0.82 | 0.30 | 2.2 | 0.17 | 11 | 0.37 |

TABLE 3-continued

|  | Organic particles | | | Film | | | |
|---|---|---|---|---|---|---|---|
|  | Type | Average particle size d (μm) | Added amount (phr) | Thickness t (μm) | St (μm) | Pc (number of protrusions/ 0.1 mm$^2$) | d/t (-) |
| Comparative Example 6 |  | 0.82 | 0.30 | 3.5 | 0.15 | 7.3 | 0.24 |
| Comparative Example 7 |  | 0.82 | 0.30 | 5.4 | 0.15 | 5.5 | 0.15 |
| Comparative Example 8 |  | 0.82 | 0.30 | 7.9 | 0.18 | 3.4 | 0.10 |
| Comparative Example 9 | SX-130H | 1.4 | 0.10 | 5.4 | 0.16 | 1.5 | 0.26 |
| Comparative Example 10 |  | 1.4 | 0.10 | 8.1 | 0.20 | 2.7 | 0.17 |
| Comparative Example 11 | SX-130H | 1.4 | 0.30 | 5.3 | 0.23 | 10 | 0.26 |
| Comparative Example 12 |  | 1.4 | 0.30 | 7.9 | 0.26 | 32 | 0.18 |
| Comparative Example 13 | MX-150 | 1.6 | 0.10 | 2.2 | 0.18 | 24 | 0.74 |
| Comparative Example 14 |  | 1.6 | 0.10 | 3.5 | 0.18 | 25 | 0.46 |
| Comparative Example 15 | MX-150 | 1.6 | 0.10 | 5.3 | 0.19 | 23 | 0.30 |
| Comparative Example 16 |  | 1.6 | 0.10 | 8.0 | 0.22 | 31 | 0.20 |
| Comparative Example 17 | MX-180TA | 1.9 | 0.10 | 5.4 | 0.19 | 23 | 0.35 |
| Comparative Example 18 |  | 1.9 | 0.10 | 7.6 | 0.23 | 14 | 0.25 |
| Comparative Example 19 | NMB-0520C | 4.8 | 0.10 | 2.0 | — | — | — |
| Comparative Example 20 |  | 4.8 | 0.30 | 2.2 | — | — | — |

TABLE 4

|  | Coefficient of static friction (-) | Winding property | Film processability | Dielectric breakdown voltage (kV/mm) |
|---|---|---|---|---|
| Example 1 | 0.46 | A | A | 781 |
| Example 2 | 0.48 | A | A | 797 |
| Example 3 | 0.45 | A | A | 749 |
| Example 4 | 0.45 | A | A | 786 |
| Example 5 | 0.46 | A | A | 809 |
| Example 6 | 0.49 | A | A | 809 |
| Example 7 | 0.48 | A | A | 824 |
| Example 8 | 0.46 | A | A | 812 |
| Example 9 | 0.47 | A | A | 797 |
| Example 10 | 0.44 | A | A | 823 |
| Example 11 | 0.46 | A | A | 755 |
| Example 12 | 0.48 | A | A | 766 |
| Example 13 | 0.47 | A | A | 796 |
| Example 14 | 0.47 | A | A | 835 |
| Example 15 | 0.46 | A | A | 799 |
| Example 16 | 0.46 | A | A | 823 |
| Example 17 | 0.46 | A | A | 830 |
| Example 18 | 0.48 | A | A | 765 |
| Example 19 | 0.50 | A | A | 774 |
| Example 20 | 0.45 | A | A | 806 |
| Example 21 | 0.45 | A | A | 766 |
| Example 22 | 0.47 | A | A | 686 |
| Example 23 | 0.44 | A | A | 663 |
| Example 24 | 0.46 | A | A | 758 |
| Example 25 | 0.47 | A | A | 704 |
| Example 26 | 0.45 | A | A | 713 |
| Example 27 | 0.45 | A | A | 731 |
| Example 28 | 0.45 | A | A | 691 |
| Example 29 | 0.47 | A | A | 708 |
| Example 30 | 0.44 | A | A | 617 |
| Example 31 | 0.43 | A | A | 627 |
| Example 32 | 0.50 | A | A | 618 |

TABLE 5

|  | Coefficient of static friction (-) | Winding property | Film processability | Dielectric breakdown voltage (kV/mm) |
|---|---|---|---|---|
| Comparative Example 1 | 0.68 | B | A | 790 |
| Comparative Example 2 | 0.64 | B | A | 883 |
| Comparative Example 3 | 0.64 | B | A | 788 |
| Comparative Example 4 | 0.69 | B | A | 856 |
| Comparative Example 5 | 0.51 | B | A | 774 |
| Comparative Example 6 | 0.53 | B | A | 913 |
| Comparative Example 7 | 0.56 | B | A | 829 |
| Comparative Example 8 | 0.61 | B | A | 776 |
| Comparative Example 9 | 0.54 | B | A | 777 |
| Comparative Example 10 | 0.55 | B | A | 738 |

TABLE 5-continued

| | Coefficient of static friction (-) | Winding property | Film processability | Dielectric breakdown voltage (kV/mm) |
|---|---|---|---|---|
| Comparative Example 11 | 0.55 | B | A | 799 |
| Comparative Example 12 | 0.53 | B | A | 756 |
| Comparative Example 13 | 0.55 | B | A | 730 |
| Comparative Example 14 | 0.53 | B | A | 880 |
| Comparative Example 15 | 0.57 | B | A | 817 |
| Comparative Example 16 | 0.57 | B | A | 780 |
| Comparative Example 17 | 0.55 | B | A | 796 |
| Comparative Example 18 | 0.53 | B | A | 750 |
| Comparative Example 19 | — | — | B | — |
| Comparative Example 20 | — | — | B | — |

INDUSTRIAL APPLICABILITY

The vinylidene fluoride resin film according to the present invention can be used as film materials for film capacitors for communication, electronic devices, power supply, medium/low voltage phase-advance, automated external defibrillators, and in particular inverters as automobile components; or film materials for piezoelectric elements, pyroelectric elements, dielectrics for supporting a transfer body, and the like.

The invention claimed is:

1. A vinylidene fluoride resin film comprising a film composition comprising a vinylidene fluoride resin and organic particles, wherein the vinylidene fluoride resin film comprises a plurality of protrusions on at least one surface thereof;

among the plurality of protrusions, the number of protrusions greater than 0.10 μm in height from a flat surface at which the protrusions are not present is from 40 to 400, per 0.10 mm$^2$ of the vinylidene fluoride resin film;

the vinylidene fluoride resin is a homopolymer of vinylidene fluoride; and a relationship $0.18 \leq d/t \leq 2.0$ is satisfied, where an average particle size of the organic particles is d (μm) and a film thickness of the vinylidene fluoride resin film is t (μm).

2. The vinylidene fluoride resin film according to claim 1, wherein a coefficient of static friction is from 0.20 to 0.50.

3. The vinylidene fluoride resin film according to claim 1, wherein the film composition comprises from 0.050 parts by weight to 3.0 parts by weight of the organic particles, per 100 parts by weight of the vinylidene fluoride resin.

4. The vinylidene fluoride resin film according to claim 1, wherein the organic particles are particles of one or more types of organic compounds selected from the group consisting of crosslinked acrylic resins and crosslinked styrene resins.

5. The vinylidene fluoride resin film according to claim 1, wherein the film composition comprises from 1.0 part by weight to 10 parts by weight of acrylic resin, per 100 parts by weight of the vinylidene fluoride resin.

6. The vinylidene fluoride resin film according to claim 1, wherein a film thickness is from 1.0 μm to 10 μm.

7. The vinylidene fluoride resin film according to claim 1, wherein the average particle size of the organic particles is from 0.50 μm to 5.0 μm.

8. The vinylidene fluoride resin film according to claim 1, wherein an average protrusion height of the protrusions is from 0.15 μm to 1.0 μm.

* * * * *